US006421009B2

(12) United States Patent
Suprunov

(10) Patent No.: US 6,421,009 B2
(45) **Date of Patent: *Jul. 16, 2002**

(54) MOBILE STATION POSITION TRACKING SYSTEM FOR PUBLIC SAFETY

(76) Inventor: Peter Suprunov, 2 de Hart Court, East Brunswick, NJ (US) 08816

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/074,610

(22) Filed: May 8, 1998

(51) Int. Cl.[7] .......................... G01S 3/02; H04M 11/00
(52) U.S. Cl. ........................ 342/465; 455/404; 342/457
(58) Field of Search ................................ 342/457, 450, 342/463, 465; 455/456, 521, 404, 434, 461, 426; 375/34, 35, 45; 379/38

(56) References Cited

U.S. PATENT DOCUMENTS

| | | | | | |
|---|---|---|---|---|---|
| 5,223,844 | A | | 6/1993 | Mansell et al. | |
| 5,327,144 | A | | 7/1994 | Stilp et al. | |
| 5,428,667 | A | * | 6/1995 | Easterling et al. | 455/410 |
| 5,519,760 | A | | 5/1996 | Borkowski et al. | |
| 5,542,100 | A | | 7/1996 | Hatakeyama | |
| 5,546,445 | A | | 8/1996 | Dennison et al. | |
| 5,555,286 | A | | 9/1996 | Tendler | |
| 5,559,864 | A | * | 9/1996 | Kennedy, Jr. | 379/59 |
| 5,659,596 | A | | 8/1997 | Dunn | |
| 5,742,666 | A | * | 4/1998 | Alpert | 379/58 |
| 5,844,522 | A | * | 12/1998 | Sheffer | 342/457 |
| 6,040,800 | A | * | 3/2000 | Raith et al. | 342/457 |

* cited by examiner

*Primary Examiner*—Gregory C. Issing

(57) ABSTRACT

A system for determining the location of a mobile station in a cellular communications network, comprising a plurality of locator units fixedly positioned for tracking and measuring communications between a base station and a mobile station initiating an emergency communication, each locator unit comprising a receiving means for monitoring a control channel of the base station for detecting and receiving identifying information including an assigned voice channel associated with the particular mobile station initiating said emergency communication, a storage means for storing the identifying information associated with the to emergency communication, a controller means for tuning the receiving means to the assigned voice channel associated with the emergency communication for receiving voice and control channel data between the base station and the mobile station, a transmission means operable in a first mode responsive to the receiving means and the controller means for initiating a second communication to a monitor unit based on the stored identifying information, the second communication occurring further including data indicative of the signal strength as a function of distance of the mobile station relative to the particular locator unit, wherein the monitor unit is responsive to the plurality of locator units for receiving the second communication from each locator unit and determining and tracking the position of the mobile station based on the received signal strengths and the known positions of the fixed locator units.

19 Claims, 6 Drawing Sheets

MOBILE STATION POSITION TRACKING SYSTEM FOR PUBLIC SAFETY

FIELD OF THE INVENTION

The invention is related to communication systems in general, and more particularly to cellular communications systems having means for determining the location of a mobile station.

BACKGROUND OF THE INVENTION

A cellular system consists of an FM radio network covering a set of geographical areas (known as Cells) inside of which mobile two-way radio units, like Cellular Telephones, can communicate. The radio network is defined by a set of base stations distributed over the area of system coverage, managed and controlled by a centralized or decentralized digital switch equipment known as MTSO, or Mobile Telephone Switching Office. A base station in its geographical placement is known as a cell site. It is composed of low powered FM transceivers, power amplifiers, control unit, and other hardware depending on the system configuration. Its function is to interface between cellular mobiles and the MTSO. It communicates with the MTSO over dedicated data links, wire or non-wire, and communicates with mobiles over the air waves. The MTSO's function is controlling call processing, call setup, and release which includes signaling, supervision, switching and allocating RF channels. MTSO also provides a centralized administration and maintenance point for the entire network. It interfaces with Public Switched Telephone Network (PSTN), over wire line voice facility, to honor services to and from conventional wire line telephones. At present, there is no way to locate wireless callers automatically when they seek emergency assistance.

When an emergency phone call initiates from a wireline telephone (using the PSTN), local exchange carrier switching software routes the call. This software associates the calling telephone number (ANI) with address information (ALI) stored in a location database and routes the call to-a centralized Public Safety Answering Point (PSAP).

When a PSAP receives an emergency call from a wireless location (using cellular, PCS, or Specialized Mobile Radio (ESMR) technology), neither ANI nor ALI information is available to the call taker. Agents must rely on the caller's ability to provide location information. Without ANI, the 911 call taker cannot re-contract the emergency caller to obtain additional information either.

Issued in June 1996, Docket 94-102 creates rules to govern the availability of basic 911 services and the implementation of enhanced 911 (E 911) for wireless services.

Phase 1 requires wireless carriers to transmit 911 emergency calls to a PSAP identifying both calling mobile unit (ANI) and cell site/cell site sector (pANI). The emergency caller must transmit a Mobile Identification Number (MIN) or its equivalent, and the local 911 district must request ANI transmission from the wireless carriers. Phase 1 compliance is required by 1998.

Phase 2 requires wireless carriers to relay an emergency caller's number, allow PSAP attendants to redial the caller in case of disconnection, and relay the location of the base station or cell site receiving the 911 call and its phase information. By 2001, the location of the mobile station must by provided to the PSAP in two dimensions (x,y) accurate within a radius of 125 meters in 67% of all cases.

Accordingly, it is highly desirable to obtain a method of locating wireless callers when they seek emergency assistance without significantly modifying the existing cellular network software and topology.

SUMMARY

A system for determining the location of a mobile station in a cellular communications network, comprising a plurality of locator units fixedly positioned for tracking and measuring communications between a base station and a mobile station initiating an emergency communication, each locator unit comprising a receiving means for monitoring a control channel of the base station for detecting and receiving identifying information including an assigned voice channel associated with the particular mobile station initiating said emergency communication, a storage means for storing the identifying information associated with the emergency communication, a controller means for tuning the receiving means to the assigned voice channel associated with the emergency communication for receiving voice and control channel data between the base station and the mobile station, a transmission means operable in a first mode responsive to the receiving means and the controller means for initiating a second communication to a monitor unit based on the stored identifying information, the second communication occurring further including data indicative of the signal strength as a function of distance of the mobile station relative to the particular locator unit, wherein the monitor unit is responsive to the plurality of locator units for receiving the second communication from each locator unit and determining and tracking the position of the mobile station based on the received signal strengths and the known positions of the fixed locator units.

DETAILED DESCRIPTION OF THE INVENTION

Figure 1:
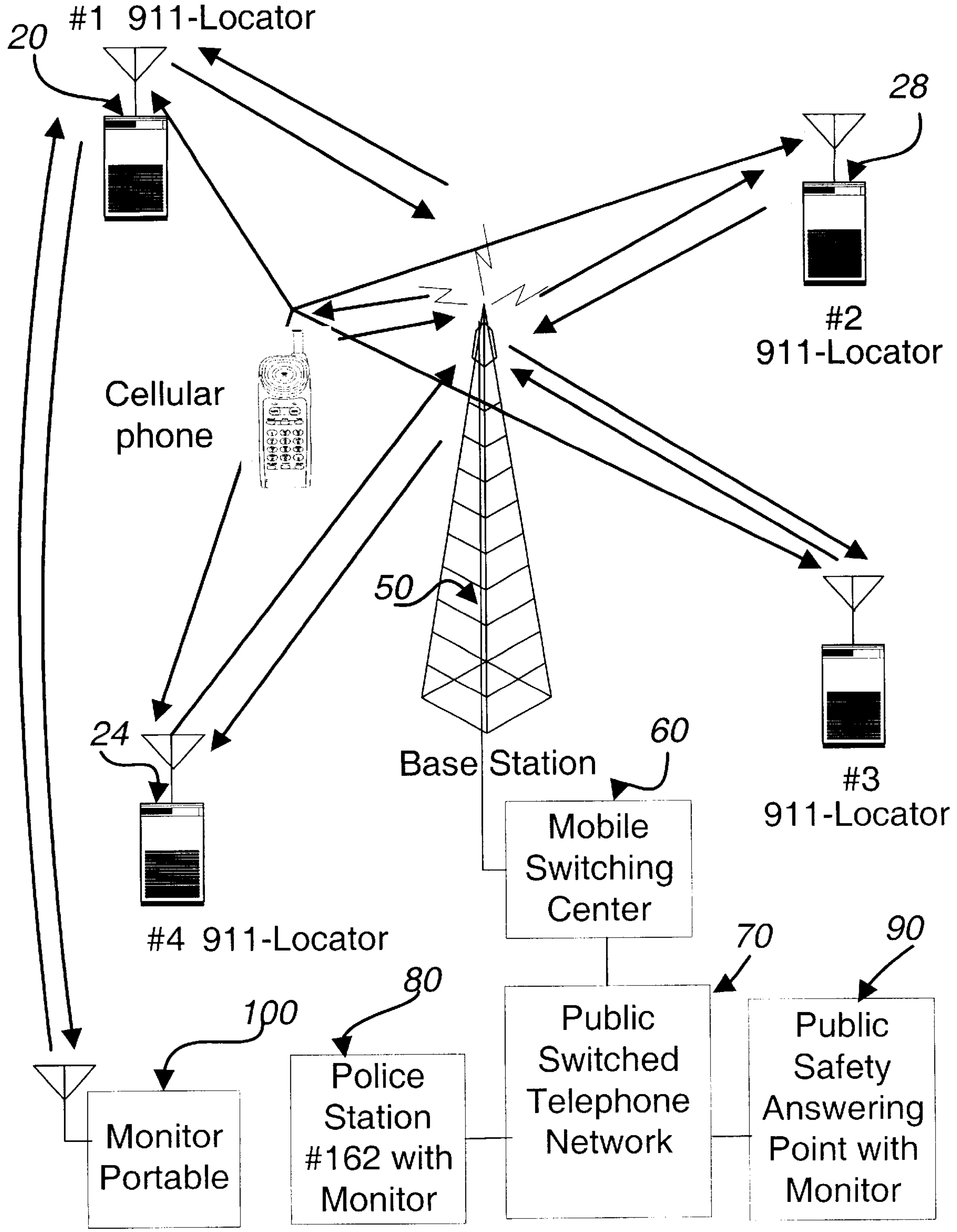
FIG. 1 provides an illustration of a preferred embodiment of the cellular network base location system according to the present invention.
Figure 2:
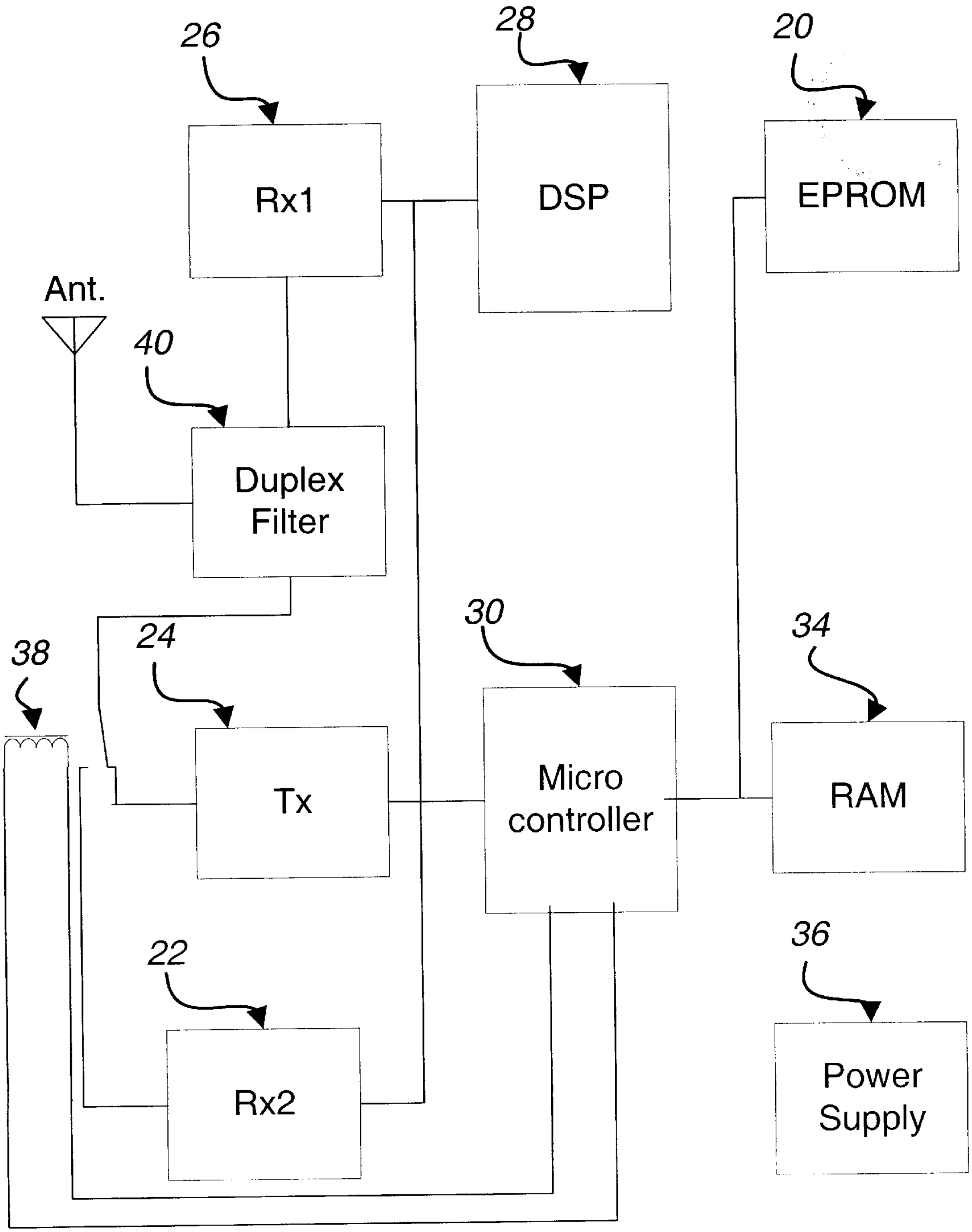
FIG. 2 provides a schematic illustration of the locator unit portion according to the present invention.

Before embarking on a detailed discussion, the following should be understood. The novel locator system illustrated in FIG. 1 is comprised of essentially two major components: an emergency locator unit 20 having components as illustrated in FIG. 2, and a monitor unit. 100 which interacts with the locator unit to receive voice and data from each locator and through triangularization determine the position of a mobile station emergency cellular phone conversation. The LDP is controlled by a microcontroller for operation in a first stand-by mode, where the locator monitor has forward and reverse control channels for emergency 911 calls initiated from a mobile station and a second recording mode for identifying information of a mobile station upon detection of an E911 call. A third active mode is entered in response to a signal from the monitor unit requesting voice channel information from the mobile station and signal strength measurements of the signal received from the mobile station which is a function of distance of the locator unit from the mobile station.

Referring now to FIG. 1, there is shown an embodiment of the cellular network based location system according to the present invention. The system 10 comprises a plurality of location determination point units (LDPs) 20, 24, and 28 for monitoring emergency cellular phone communications activity and transmitting such information to a monitor unit 100 located at a predetermined distance from each of the location units for calculating the position of a mobile station 40 based on the signal strength received from each of the locator units. As is well known, a typical cellular telephone network comprises a geographic area divided into a number of small neighboring cells, each containing a base station 50 as shown in FIG. 1. The cell periphery contains each of the elements shown in FIG. 1, including the LDPs and base station. The base station 50 is assigned a number of two-way voice channels used to transmit voice signals to and from mobile station 40 and a number of set-up or control channels. Preferably, mobile station 40 is a cellular radio telephone. These channels are used for transmission of digital control information to and from the mobile station for establishing a voice communication link. The control channels assigned to each base station generally include several fields of data including a set-up call information such as a MIN number, assigned voice channel, and signal strength of the mobile station. Generally, each of the channels assigned to a particular base station operate a different frequency in order to avoid interference. Note that there is a number of limited frequencies available within a network. However, base stations remote from one another may be assigned one or more of the same frequency channels.

As is well known, voice information is generally transmitted over voice channels using frequency modulated (FM) analog signals, while setup and control information is transmitted over control channels effective using FM digital signals. Other methods of modulating voice and digital data onto the carrier signals may also be used including the amplitude modulation (AM), quadrature phase shift keying (QPSK), and binary phase shift keying (BPSK).

Mobile switching center 60 is interconnected with base station 50, as well as with public switch telephone network (PSTN) 70. The mobile switching center maintains network identification data for each mobile station 40 being served in certain cell sites. In general, a plurality of mobile switching centers, in communication with the base station and other switching centers, perform processing and switching functions enabling connections between mobile stations and interfacing to external PSTN network for routing signal communications over conventional telephone lines to emergency response modules 80 and 90, such as a police station or public safety answering point. Note that when an emergency call initiates from a wireline telephone using the PSTN, local exchange carrier switching software routes the call. This software associates the calling telephone number with address information stored in the location database and routes the call to a centralized public safety answering point. Note further that, as previously mentioned, when a PSTN receives an emergency call from a wireless location using cellular PCS or specialized mobile radio technology, neither the calling telephone number nor the address information is available to the call taker. Rather, agents must rely on the caller's ability to provide this location information. Still further, without the calling telephone number, the 911 call taker is unable to recontact the emergency caller to obtain additional information.

Figure 3:
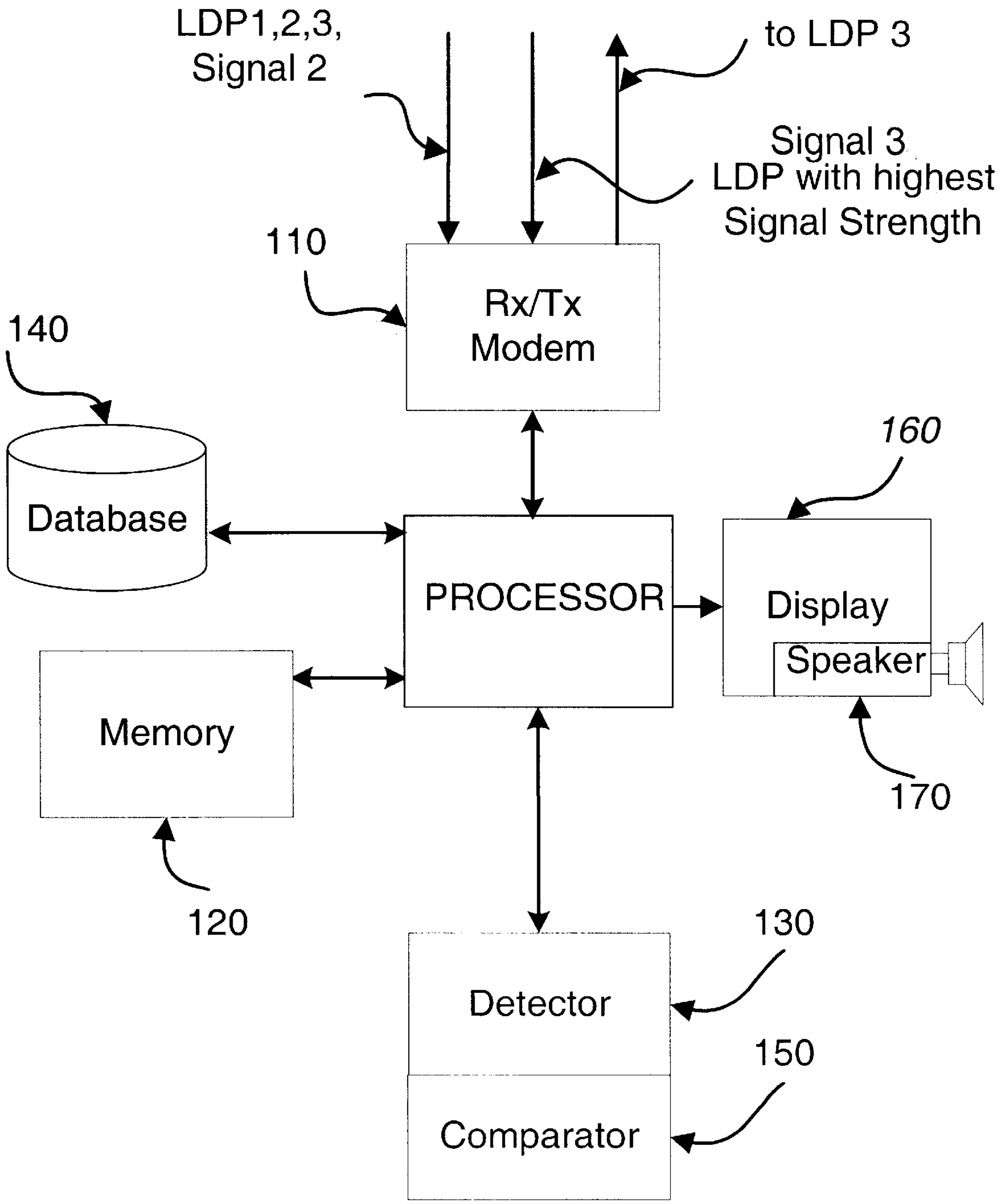
FIG. 3 is a schematic illustration of the monitor unit portion according to the present invention.
Figure 4:
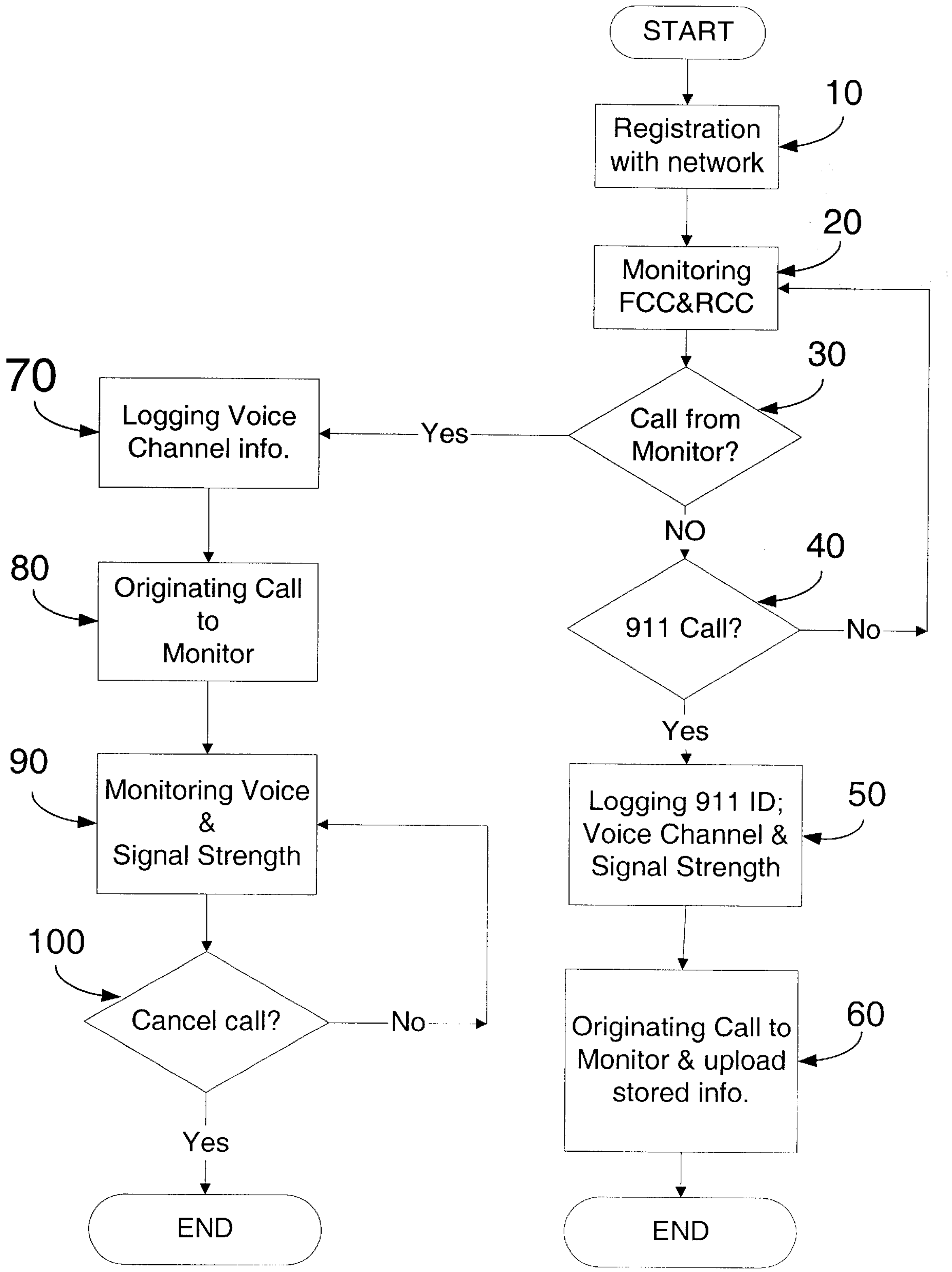
FIG. 4 provides a flow chart depicting the operation of the locator unit portion of the location system according to the present invention.
Figure 5:
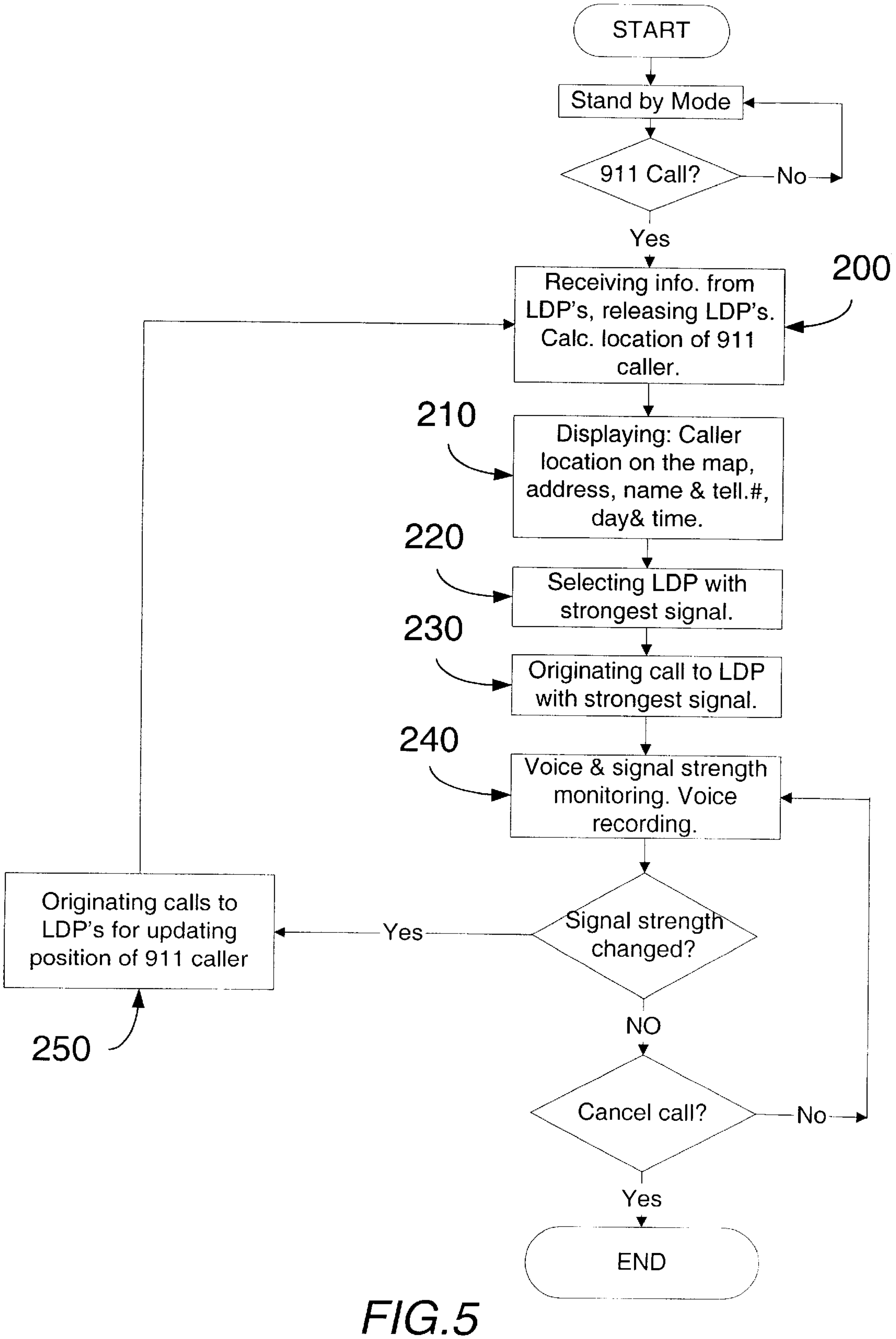
FIG. 5 provides a flow chart depicting the operation of the monitor unit portion of the location system according to the present invention.

The operation of the novel location determination system will now be described with reference to FIGS. 1–5 of the drawings. Referring now to FIG. 1, in conjunction with FIGS. 2 and 4, each location determination point unit 20, 24, and 28 is positioned inside a particular cell at a predetermined distance between the center of the cell (i.e. base station) and the cell perimeter 55. In the preferred embodiment, each LDP is placed at an equal distance between the base station and cell perimeter. As shown in FIG. 2, the main components of each LDP include receivers 22 and 26 for monitoring various cellular voice and/or control channels, transmitter 24, and RAM memory 34. Each LDP within the cell registers with the network and is activated within the particular cell using the same protocol as in conventional cellular telephone communications. Each LDP operates to monitor continuously the forward control channel (FCC) and reverse control channel (RCC) of a particular cell for detecting an emergency 911 communication from a mobile station 40 to base station 50 (Signal 1). Note that receiver 26 continuously monitors the FCC via Duplex filter and antenna 40, while receiver 22 monitors the RCC, which lags the FCC by approximately 25 mega cycles. FIGS. 2–3 show a preferred embodiment of an LDP unit 20, and monitor unit too, respectively, FIGS. 4 and 5 represent flow diagrams of a 911 LDP of unit and 911 monitor unit. Referring to this figures, the LDP operates, upon registration with the network, to monitor both the forward and reverse control channels for a signal either from the monitor unit 100 or from a mobile station where an emergency 911 call has been initiated. When the LDP detects the emergency communication signal between the mobile station and the base station, DSP 28 (FIG. 2) is operable to measure the signal strength of the received signal from the mobile station as a function of distance of the particular LDP from that mobile station. EPROM 32 and RAM 34 operate in response to the emergency signal detection to originate the communication (i.e. telephone call) to a predetermined number which has been stored in memory 34 and which is associated with the monitor unit 100. The stored setup call information is than transmitted via transmitter 24 (FIG. 2) in addition to transmission of each LDP's unique identification number, also stored in RAM 34. In this manner, the identity of the mobile station, the assigned voice channel, the measured signal strength, and the LDP ID associated with the transmitting LDP are communicated from the LDP to the monitor (module 60). Upon detecting of any 911 call (module 4C) emergency setup request received on the RCC via receiver 22 through antenna and duplex filter 40, each LDP 20 will baseband process the signal via DSP 28 and record in memory 34 the setup call information associated with the mobile telephone seeking to establish the telephone link and thus, communication with the base station (module 50). Setup call information includes the 911 ID or MIN number, the assigned voice channel over which the communication will occur, and the measured signal strength of the mobile station. The LDP then stores each of these parameters in RAM 34. Each LDP unit then tunes its receiver 26 to the assigned voice channel for receiving voice and data from the base station. With reference to FIGS. 1, 2, 3, and 5, monitor unit 100 (FIG. 3) functions to receive a transmission (i.e. signal 3) from each LDP at modem 110 and calculates the position of mobile station 40 based on the signal strength values obtained from each LDP. That is, each LDP operates to measure the signal strength based on the relative distance from mobile station 40. This measured signal strength, assigned voice channel, MIN number, and LDP ID, transmitted to monitor 100, is received by modem 110, and stored in memory 120. The monitor 100 thus receives the information from each LDP sequentially by receiving information from the first calling LDP, storing the information, and terminating communication with the LDP (i.e. release LDP). The same process is repeated for each of the second and third LDPs. Memory 120 further includes prestored values of the distances of the locator units, and positions of those units in the cell (i.e. x,y coordinates). Then, based on the received signal strength indicators from each of the LDP units and the known coordinate positions of each of the LDPs, the monitor operates to use triangular location of each of the three transmitted signal strengths to obtain the relative geographic position of the mobile station within the cell via detector circuit 130. It should be noted that every cell requires the use of a minimum of three LDPs providing signal measurements in order to perform the triangularization. However, more LDPs may be used, depending on the cell coverage area. Note that the monitor unit is also operable to receive signals from LDPs in other cells and to initiate communications with those LDPs for tracking of the mobile station and performing any cell handoff activities. Note that the monitor unit includes in its memory and database a list of each of the LDPs of neighboring cells in addition to the LDPs associated with the cell in which the monitor is located, such that the location and cell associated with a particular LDP is readily determinable via the monitor.

In any event, detector circuit 130 also operates to compare the received signal strength included in each of the LDP signals with one another to determine the strongest signal for voice monitoring. As previously mentioned, communication with the LDPs is sequentially terminated and the LDPs are released. In response, the contacted LDP then transmits voice and signal strength data associated with the mobile station emergency call received via receiver 22 to monitor 100. However, upon determination of the LDP having the strongest signal, monitor 100 originates a call to that LDP to transmit voice and signal strength information associated with the particular mobile station on the assigned voice channel (module 240 of FIG. 5).

The monitor unit may be implemented as a PC computer and include a map/graphical user interface for displaying map data, as well as a cellular phone subscriber data base 140, and a display screen 160. The subscriber data base 140 includes user identifying data for associating the MIN number of the mobile station with the user or subscriber associated with that mobile phone. The database includes the MIN number or telephone number associated with the mobile station and the identity of the user corresponding to MIN number including the user's home telephone number, that user's name, address, and any other relevant identifying information. The monitor unit then functions to display on the display terminal 160 a map of the cell area, as well as the determined position of the mobile station on the map, and the identifying information of the user associated with the mobile station onto the display terminal. A speaker provides the received voice communication output at the monitor in an audible format. The display information includes a telephone number, name, date, time, and recording of the phone conversation. Monitor 100 maintains communication with the LDP 20 having the determined strongest signal for voice monitoring. Information regarding signal strength is periodically transmitted from locator 20 to monitor 100. Monitor 100 further includes logic in circuit 130 for periodically sampling the signal strength associated with the transmitting LDP having the highest signal strength and comparing the signal with a threshold value stored in memory. Comparator 135 functions to compare the received signal strength with the stored value. If the received signal strength varies from the stored value by a predetermined amount, such variation is indicative of the change in position of the mobile station, and monitor 100 operates to originate a call via modem 110 to each of the locator units to perform a new signal strength measurement and to return such information to the monitor unit for calculating a new position of the 911 caller (module 250 of FIG. 5). In this manner, LDP locator units, in conjunction with the monitor, operate to detect, identify, and track a mobile station, making an emergency cellular phone call. FIGS. 4 and 5 provide flow charts illustrating the above described operation of the system.

Figure 6:
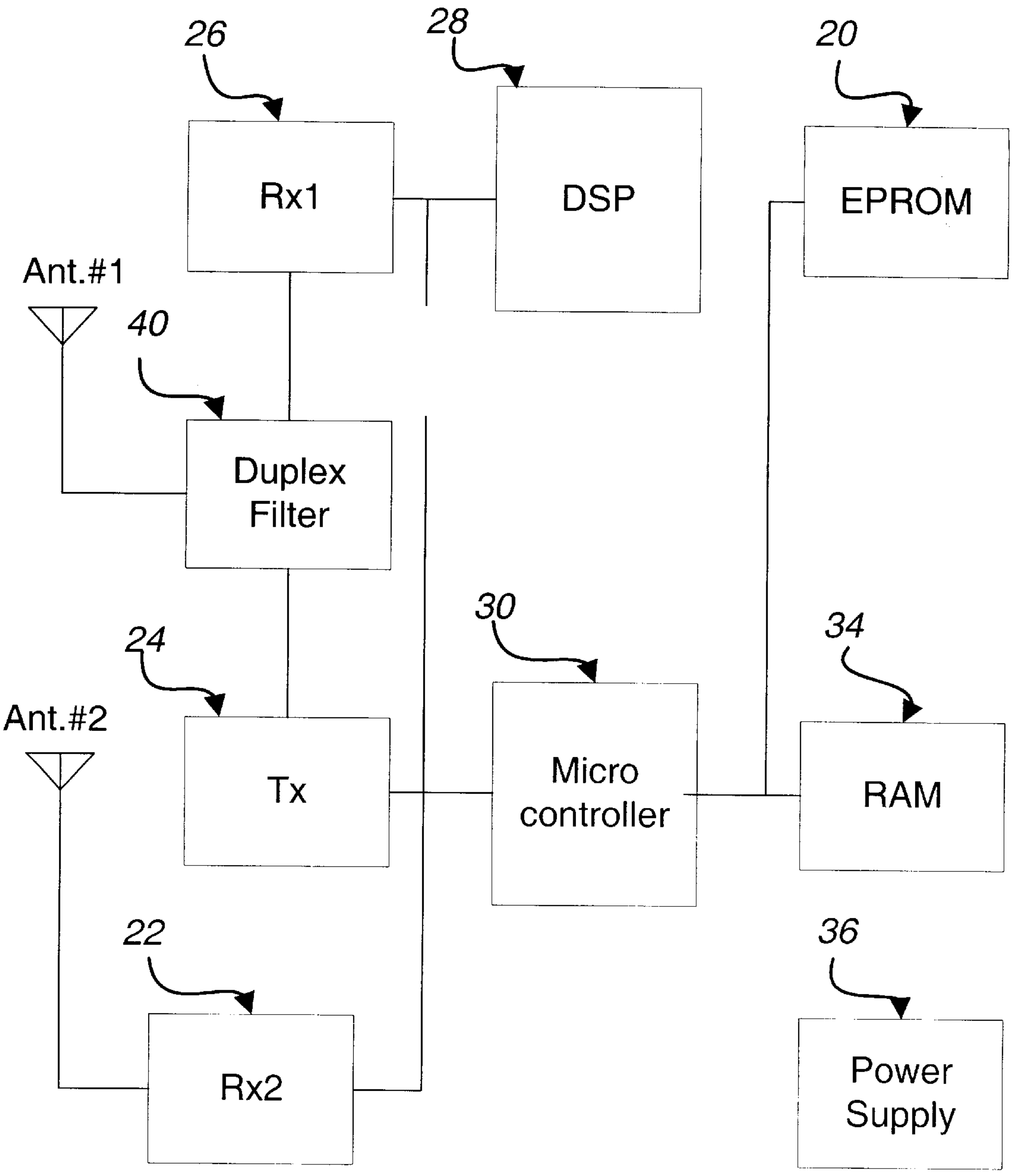
FIG. 6 provides a schematic illustration of an alternative embodiment of the locator unit portion according to the present invention.

Referring again to FIG. 2, each LDP comprises receiver 22 for monitoring and receiving RCC data, in order to detect an (E911) emergency communication, a transmitter 24 which is responsive to the detection from receiver 22 for transmitting voice and data to the monitor 100, and a receiver 26 for receiving voice and forward control channel data from the base station via monitor 100 when the monitor requests new signal strength measurements for new position calculation using conventional cell phone call procedures and protocols. Processor 28 performs digital signal processing for baseband processing of the system for detecting the presence of an emergency signal. Microcontroller 30 controls each of the system modes via switch 38 to perform either forward control channel (FCC) reception, transmission, or RCC passive listening via filter and antenna 40. Memory devices 32 and 34, serve as peripherals to microcontroller 30 for storing the setup call information signal strength and additional data required for cellular protocol in communications. Power supply 36 operates to provide sufficient operating power to the unit. Alternatively, the LDP may be configured as illustrated in FIG. 6. In this embodiment, switch 38 has been eliminated and receiver 22 includes an associated dedicated antenna 42. This embodiment permits continuous monitoring of the appropriate RCC for a voice channel and data for response to either an emergency 911 call or in response to a call from the monitor unit requesting new signal strength measurements. In the preferred embodiment, the receiver sensitivity for each of the receiver units at 12 DB(SINAD) demodulated signal-to-noise ratio is −116 DBm. The maximum power transmitted by the transmitter is approximately 630 mW, while the received signal strength dynamic range measurement is −90 DB. The DSP includes all functions associated with control data supervision (SAT) and signal strength measurements in signaling and is incorporated into a single data processor. A microcontroller PCB80C552 operates to control and handle the function of the LDP with low power and high operation speed. Normally, capacity of the LDP unit is approximately 32 digits, while the power supply is preferably a 7.2 v Nicda with an AC/DC adapter.

As a result of the operation of this novel locator system, no changes are necessary to existing cellular network topology. The monitor 100 may be placed at any number of positions and a number of monitors may be used. Further, these monitors may be used in police station and PSAPs. As a result, base station, cell phone, and mobile switching center software, in addition to PSTN communication software require no modification.

Still further, while it has been shown that monitor unit 100 receives locator transmission via the cellular network, each locator may also include the capability to originate telephone calls via local land lines in order to notify appropriate personnel.

While there has been shown a preferred embodiment of the present system, it should be understood that a person may make many variations and modifications to the embodiment utilizing functionally equivalent elements to those described herein. For instance, while discussion has focused on operation within a particular cell, the system is capable of performing handoff and tracking of the mobile station across a number of cells, via conventional cellular system handoff protocol. Any and all such modifications, as well as others which may become apparent to those skilled in the art, are intended to be included within the scope of the invention as defined by the appended claims.

What is claimed is:

1. A local area direct law enforcement emergency notification system for determining the position of a mobile station in a cellular communications network, comprising:

at least three independent locator units installed in each cell and fixedly positioned for tracking and measuring communications between a base station and said mobile station initiating an emergency communication, each said locator unit comprising;

omni directional receiving means for monitoring control channels of said base station for detecting and receiving mobile station identifying information including an assigned voice channel associated with said particular mobile station initiating said emergency communication;

storage means for storing said identifying information associated with said emergency communication;

controller means for tuning said omni directional receiving means to the assigned voice channel associated with said emergency communication for receiving voice and control channels data between said base station and said mobile station;

omni directional transmission means operable in a first mode responsive to said omni directional receiving means and said controller means for initiating a second, direct communication to at least one independent portable monitor unit based on said stored identifying information, said second communication further including data indicative of the signal strength of said mobile station relative to said particular locator unit; wherein at least one said independent portable monitor unit is responsive to said plurality of independent locator units for receiving said second communication from each said locator unit and determining and tracking the position of said mobile station based on said received signal strengths and the known position of said fixed independent locator units.

2. The local area emergency service system according to claim 1, wherein said omni directional transmission means is operable in a second mode for initiating a third communication to at least one said independent portable monitor unit voice information and signal strength data received via said omni directional receiving means tuned to said assigned voice channel of said emergency communication from said mobile station.

3. The local area emergency service system according to claim 2, wherein at least one said independent portable monitor unit includes detection means responsive to the second communication from each said locator unit for determining the locator unit transmission having the strongest signal strength, said detection means also operable for determining the position of the mobile station by association of the relative position of each of the independent locator units within the cell and the corresponding signal strength as a function of distance of the signal detected by said omni directional receiving means.

4. The local area emergency service system according to claim 3, wherein at least one said independent portable monitor unit further includes display means including a map of the cell areas for displaying the position of said mobile station on the map and identifying information of a user associated with said mobile station onto a display.

5. The local area emergency service system according to claim 4, at least one said independent portable monitor unit further including speaker means for providing audible voice information received from said locator unit omni directional transmission means.

6. The local area emergency service system according to claim 5, at least one said independent portable monitor unit further including means for determining changes in signal strength from said locator unit having the highest transmitted signal strength and operable in response to a change in said highest signal strength exceeding a predetermined variation threshold for initiating a fourth communication to said plurality of independent locator units for obtaining new signal strength data in order to calculate a new position associated with said mobile station.

7. The local area emergency service system according to claim 6, wherein said fourth communication initiated over a Reverse Control Channel.

8. The local area emergency service system according to claim 1, wherein each said locator unit is fixedly positioned an equal distance between the center of the cell and the perimeter of the cell.

9. The local area emergency service system according to claim 1, wherein said identifying information further includes a MIN number associated with said mobile station, signal strength of said mobile station, and wherein second communication further includes said particular locator unit's identification number.

10. A method for determining the location of mobile station in a cellular communication network with direct delivery of emergency information to an appropriate law enforcement agency, said method comprising the steps of:

monitoring within a cellular cell via a plurality of omnidirectional fixed positioned independent locator units LDPs with omnidirectional transmitting and receiving, a control channel of a particular cell in said cellular network for an emergency communication between a mobile station and a base station;

upon detection of said emergency communication, recording set-up call information associated with emergency call between said mobile station and said base station;

measuring signal strength of the emergency communication;

broadcasting a second communication from said plurality of fixed positioned independent locator units to the appropriate law enforcement agency in response to said detection, said second communication including the set-up call information associated with said first emergency communication, and the measured signal strength of said mobile station as a function of distance from each of said plurality of fixed positioned independent locator units;

directly receiving said second communication at said law enforcement agency; and determining the position of said mobile station based on a comparison of the signal strengths associated with said second communication from each of said plurality of fixed positioned independent locator units.

11. The method according claim 10, further comprising providing a data base of pre-stored user identification data associated with a portion of said setup call information included in said emergency communication; and retrieving said user identification data indicative of a particular user associated with said mobile station in response to said second communication for displaying said retrieved user identification data and said mobile station position onto a display terminal.

12. The method according claim 11, further comprising the step of:

determining from said plurality of fixed position sources the source having the highest signal strength associated with said second communication indicative of the strength of said mobile station as a function of distance from said fixed source; and terminating communication with and releasing all other said fixed position sources.

13. The method according claim 12, further comprising the steps of:

originating a third communication from monitor units to said LDP-source having said highest signal strength and receiving voice and signal strength data from that LDP-source associated with the emergency communication from said mobile station.

14. The method according claim 13, further comprising the steps of:

periodically sampling the signal strength associated with said fixed position source having the highest signal strength and comparing with a predetermined threshold; and calculating a new position of said mobile station by originating a third communication to each of said plurality of fixed position LDP's-sources to provide a new measurement of the signal strength of said mobile station as a function of distance from said respective fixed position LDP's.

15. The method of claim 14, wherein said plurality of fixed position LDP's are equally spaced between a center of the particular cell and the perimeter of said cell.

16. The method according claim 15, wherein said setup call information includes MIN number, assigned voice channel, and signal strength of said mobile station.

17. The method according claim 16, wherein said second communication further includes an identification number associated with said particular fixed position LDP's.

18. The method according claim 17, further comprising the step of controlling the switching between the monitoring, receiving and transmission of said emergency and said second and third communication for each of said plurality of said fixed position LDP's.

19. An independent local area emergency service system for determining the position of a mobile station in a cellular network comprising at least three independent locator units with omni directional antennas installed in each cell, each said locator unit is fixedly positioned in said same particular cell of said network, and said locator units are positioned (at) an equal distance between said base station and the periphery of said cell border for tracking and measuring emergency communication between said base station and said mobile station initiating an emergency cellular telephone call, each said locator unit comprising:

a first receiver for monitoring a Reverse Control Channel for emergency call detecting and receiving identifying information including an assigned voice channel and MIN number associated with said emergency telephone call from the particular mobile station;

memory for storing the identifying information associated with said emergency telephone call;

a second receiver for monitoring a Forward Control Channel for tuning said first receiver to a mobile station assigned voice channel;

a transmitter responsive to both the first and second receivers and operable in a first mode for broadcasting a second communication signal to at least one independent portable monitor unit based on the identifying information, and including data indicative of the signal strength of the mobile station relative to said particular locator unit, and in a second mode responsive to at least one said portable monitor unit for broadcasting a third communication including voice and signal strength data via said assigned voice channel, and wherein the monitor unit is responsive to the three independent locator units in said first mode for receiving the second communication including signal strength and identifying information and determining the position of said mobile station based on the received signal strengths and known positions of the fixed independent locator units, and in said second mode, the monitor unit selecting the said locator unit having the highest signal strength of said plurality of independent locator units for receiving said third communication of voice and data; and wherein said at least one said independent portable monitor unit includes a computer console and data base containing information associated with said mobile station such that upon receipt of said identifying information, additional information retrieved from said data base is displayed on said console in addition to said position of said mobile station and said voice communication.

* * * * *